United States Patent [19]

Zappe

[11] 3,879,715

[45] Apr. 22, 1975

[54] DAMPED JOSEPHSON JUNCTION MEMORY CELL WITH INDUCTIVELY COUPLED RESISTIVE LOOP

[75] Inventor: Hans H. Zappe, Granite Springs, N.Y.

[73] Assignee: International Business Machines Corporation, Armonk, N.Y.

[22] Filed: Dec. 28, 1973

[21] Appl. No.: 429,412

[52] U.S. Cl. ............ 340/173.1; 307/212; 307/238; 307/306

[51] Int. Cl. ........................ G11c 11/44; G11c 5/02

[58] Field of Search ......... 340/173.1; 307/212, 306, 307/238

[56] References Cited

UNITED STATES PATENTS 3,705,393 12/1972 Anacker et al. ................ 340/173.1

3,764,905 10/1973 Zappe ............................ 340/173.1

OTHER PUBLICATIONS

Matisoo; Modification of Tunnel Junction Resistance in Josephson Devices, IBM Technical Disclosure Bulletin, Vol. 16, No. 5, 10/73, pp. 1437–1439.

Zappe; Damping Elements in Josephson Devices, IBM Technical Disclosure Bulletin, Vol. 15, No. 1, 6/72, p. 225.

Jutzi; Josephson-Junction with Negligible Hysteresis, IBM Technical Disclosure Bulletin, Vol. 16, No. 6, 11/73, p. 2020.

*Primary Examiner*—Stuart N. Hecker

*Attorney, Agent, or Firm*—Pollock, Philpitt & Vandesande

[57] ABSTRACT

A memory cell comprising at least one Josephson junction is properly damped for effective operation by inductively coupling a resistive loop to the memory cell. The resistive loop may be located in the vicinity of the vertical projection of the memory cell so as to not affect the packing of a plurality of memory cells.

17 Claims, 5 Drawing Figures

DAMPED JOSEPHSON JUNCTION MEMORY CELL WITH INDUCTIVELY COUPLED RESISTIVE LOOP

BACKGROUND OF THE INVENTION

1. Field of the Invention

This invention relates to a superconducting memory cell which is properly damped for effective operation.

2. Description of the Prior Art

The prior art contains descriptions of superconducting memories made up of a plurality of memory cells wherein each cell includes at least one Josephson tunneling junction. In this regard see U.S. Pat. No. 3,705,393, the disclosure of which is incorporated by reference. The aforementioned patent is assigned to the assignee of this application. Memories comprising superconducting memory loops employing Josephson junctions enjoy a number of advantages as compared with other memory arrangements. These devices exhibit extremely fast switching speeds and their low heat dissipation enables them to be closely packed. The equivalent circuit of such a memory cell can be represented as a parallel combination of a lossless inductance L, a resistance $R_j$ and a capacitance C. The inductance L is lossless since the loop is superconducting, and the inductance is attributable to the geometry of the loop. The resistance $R_j$ is a function of the Josephson tunneling device and is related to the geometry thereof. The capacitance C is a function of the size of the Josephson device. The prior art indicates that to avoid erratic operation of the memory cell the combination should be critically damped. A discussion of this characteristic can be found in the aforementioned patent.

It has been found possible by choosing the proper junction size to construct Josephson tunneling devices which, when placed in a superconducting loop, will result in a critically damped loop. However, this constraint severely restricts the designer. Furthermore, since the Josephson junction exhibits such low power dissipation, it is possible to produce memory arrays employing this device in miniaturized form. In this form, using sub-mil technologies, it is not possible to provide a critically damped loop because the resistance $R_j$ of the tunneling junction, is greater than the resistance necessary for critical damping. The aforementioned patent also mentions the possibility of connecting an external resistive device across the Josephson tunneling junction so that the parallel combination of the external resistor and the resistance $R_j$ of the tunneling junction will result in a critically damped memory loop. Such a procedure is feasible but it leads to a number of disadvantages.

To understand the difficulties with this arrangement one must understand that for sub-mil technologies the resistance needed to critically damp a superconducting loop with a Josephson junction will vary from about one to ten ohms. However, the Josephson tunneling device resistance $R_j$, is of the order of 3 to 100 ohms. Therefore, for critical damping, and external resistor of approximately one to ten ohms must be connected across the Josephson device. With the materials presently available for use as such an external resistor such a resistive device would occupy a greater area than the memory cell itself. The fact that an external device of such large dimensions is required obviously reduces the number of memory cells which may be packed in a given area. This is directly contrary to the reason for going to a superconducting memory comprising a Josephson device. From the foregoing it is apparent the prior art lacks a teaching of means by which a superconductive memory cell employing a Josephson junction can have its damping adjusted. Furthermore, the prior art also lacks a teaching of how such a damping device adjustment can be made in a practical manner without occupying area in addition to the area taken by the memory loop. Accordingly, it is a primary object of the present invention to provide a superconductive memory loop employing at least one Josephson tunneling device which has its damping adjusted so that the loop is critically or over damped.

It is another object of the present invention to provide such a superconductive memory which has its damping adjusted without affecting the switching speed of the memory cell.

It is still another object of the present invention to provide a superconductive memory cell with properly adjusted damping which does not occupy substrate area in addition to that occupied by the memory cell.

SUMMARY OF THE INVENTION

In order to adjust the damping of a superconducting memory cell with at least one Josephson tunneling device therein, resistive means is provided which is inductively coupled to the memory cell. The resistive means can take the form of a resistive loop located in a plane different from the plane occupied by the memory loop. Preferably, the resistive loop lies in a plane parallel to the plane in which the memory cell lies, and is spaced from the plane of the memory loop in a direction normal to said memory loop. A number of factors determine the effect of the resistive loop in the memory loop. One factor that must be considered is the material of the resistive loop. As is well known to those skilled in the art the components of a superconducting memory cell are fabricated by using integrated circuit techniques such as by depositing materials in different layers on a substrate. The material of the loop itself is so chosen that at operating temperature, the loop is superconductive. Since the resistive loop will be located in the same environment as will be the superconducting loop the resistive loop should be of a normal material, i.e., one that is not superconductive. The type of material employed and the size of the loop will determine the resistance of the loop. However, the effect of the resistive loop on the memory loop is further determined by the coupling between the memory loop and resistive loop. To this end, the desired coupling can be controlled by selecting the distance between the two loops. Furthermore, another factor that determines the degree of coupling of these two loops is the amount of overlap there between. To that end, to reduce the coupling the area of the resistive loop can be smaller than the memory loop. Correspondingly the area of the resistive loop can be increased, up to the area of the memory loop, to increase the degree of coupling.

The aforementioned patent indicates that the preferred values of the loop parameters will result in a critically damped loop. For an equivalent circuit which comprises a parallel combination of resistance, inductance, and capacitance, that value of resistance is equal to $\frac{1}{2}\sqrt{L/C}$. However, in some situations it may be desirable to have the loop over damped in which case the equivalent resistance would be less than the resistance for critical damping.

In fabricating conventional superconductive memory loops employing Josephson tunneling devices, the technique is to deposit, on a substrate, a ground plane, deposit an insulating layer over the ground plane, and then deposit the components of the memory loop above the insulating layer. In practicing the present invention, the resistive loop may be located above or below the memory cell on the substrate. That is, one may deposit the resistive loop above the ground plane. A second insulating layer may then be provided above the resistive loop and the memory cell may then be deposited above the second insulating layer. However, the second insulating layer may not be necessary and it may be possible to deposit the memory loop directly above the resistive loop. On the other hand, the resistive loop may also be deposited above the memory loop on the substrate, with or without an insulating layer between the resistive loop and memory loop.

In some instances, superconductive memory cells employing Josephson tunneling devices will employ more than one Josephson tunneling device in each loop. The prior art which had suggested employing an external resistor conductively connected to the Josephson tunneling device would of course require an external resistor for each Josephson tunneling device. As has been referred to above, these resistors require substrate area and are undesirable for this reason. Multiplying the number of external resistors per loop, of course multiplies the area occupied by these external resistors. The present invention has the further advantage that only a single resistive loop is required for each memory loop. Therefore, even for superconductive memory loops with more than one Josephson tunneling device therein, only one resistive loop is required.

The foregoing and other features and advantages of this invention will be apparent to those skilled in the art from the following description of preferred embodiments of the invention as illustrated in the accompanying drawings.

DETAILED DESCRIPTION OF PREFERRED EMBODIMENTS

Figure 1A:
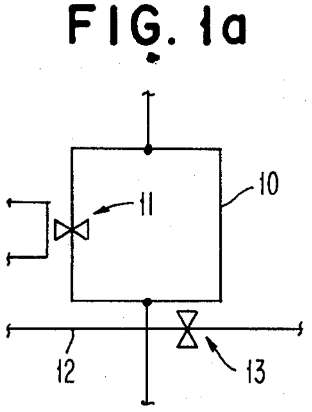
FIG. 1*a* is a diagrammatic representation of a memory loop.
Figure 1B:
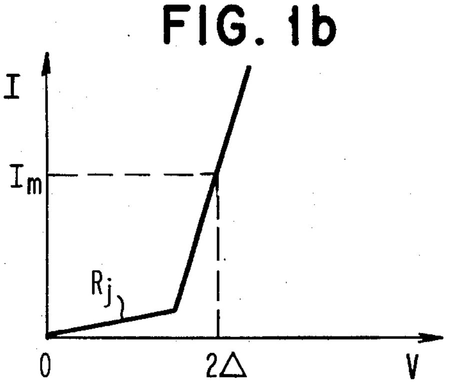
FIG. 1*b* is a linear approximation of the I–V characteristic of the Josephson device.

In FIG. 1*a*, 10 represents a superconductive memory loop with a Josephson tunneling device 11. Information stored in the loop 10 may be read out via sense line 12 which includes another Josephson tunneling device 13. In a reading, or a writing operation of the memory loop 10, Josephson tunneling device 11 is operated through a complete cycle. Initially the Josephson tunneling device 11 is in its 0 voltage state. In this state, current can flow through the junction 11, and thus through the loop 10, without producing a voltage across the tunneling junction 11. Since the loop 10 is superconductive, essentially no voltage drop exists in this circuit. This current has an upper bound $I_m$. When the current increases above this level, the tunneling device 11 becomes resistive and a voltage is developed across the junction 11. FIG. 1*b* illustrates the characteristics of the Josephson device with current I through the junction plotted on the vertical axis and voltage V across the junction plotted on the horizontal axis. Thus, the Josephson device has current increasing up to $I_m$ at which point a voltage is rapidly developed across the junction equal to the gap voltage $2\Delta$. As the current though the Josephson device is decreased it remains in the resistive state. FIG. 1*b* illustrates a linear approximation of the Josephson device characteristics. In particular, the resistance $R_j$ is the important parameter during device switching.

Figure 2:
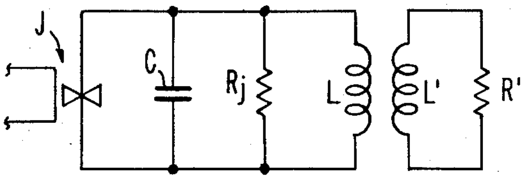
FIG. 2 is an equivalent circuit of the memory cell showing the damping corrective means of the present invention.
Figure 2A:
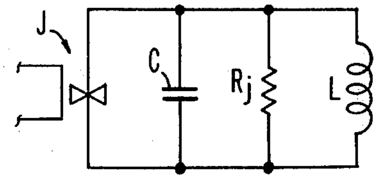
FIG. 2*a* is an equivalent circuit of a conventional memory loop.

FIG. 2*a* illustrates an equivalent circuit for the memory loop with the Josephson device therein. This includes representation of a Josephson device J, a parallel capacitance C, a parallel resistor $R_j$ and a parallel inductance L. The inductance L shown in the equivalent circuit is due mainly to the geometry of the superconductive loop. Since the loop is superconductive the inductance is essentially lossless. The capacitance of the memory cell is a combination of the capacitance of the superconducting loop and the Josephson device. These capacitances are in parallel and since the capacitance of the loop is very small in comparison with that of the Josephson device it can be neglected and therefore the capacitance C shown in the equivalent circuit of FIG. 2*a* is mainly due to the capacitance of the Josephson device. Similarly the resistance $R_j$ shown in the equivalent circuit of the memory loop is the resistance of the Josephson device.

The aforementioned patent specifically describes the necessity for proper damping of the memory cell for efficient and effective operation. For the parallel equivalent circuit shown in FIG. 2*a* the resistance necessary for critical damping is equal to $\frac{1}{2}\sqrt{L/C}$. For miniaturized cells, where the cell is fabricated with thin film techniques and especially in sub-mil technology the inductance of the memory cell and the capacitance of the Josephson device require a resistance between 1 and 10 ohms for critical damping. However, the resistance $R_j$ of the Josephson device is of the order of 3 to 100 ohms. For critical damping additional resistance, in parallel with $R_j$ is required in order to reduce the effective resistance of the parallel equivalent circuit. Absent such adjustment the resistance of the equivalent circuit results in an underdamped R-L-C circuit. Under these conditions, the memory loop operation is erratic and inaccurate. This has been recognized and the aforementioned patent describes the use of an external resistor bridging the Josephson junction. As has been explained above, however, the presently available materials for use in thin film technologies require an inordinate amount of substrate area for this external resistor.

Figure 3:
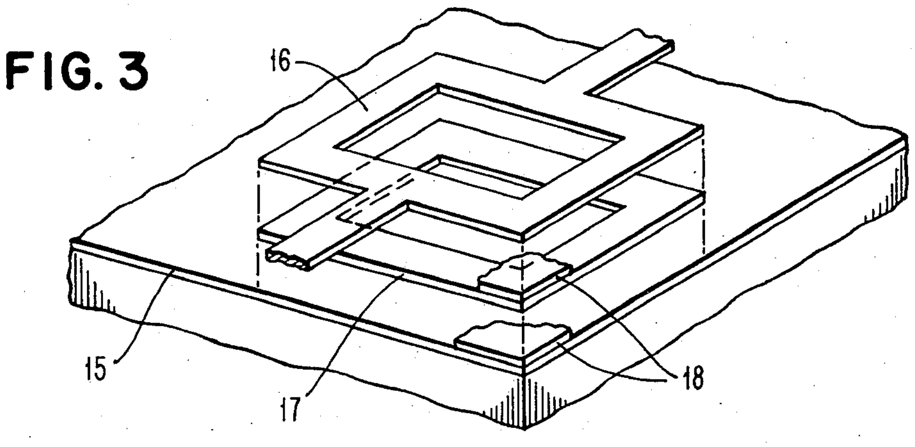
FIG. 3 is a schematic representation of a memory loop with the damping correction means of the present invention.

FIG. 3 is a diagrammatic representation of a memory cell with a damping correction means in the form of a resistive loop inductively coupled to the memory cell. In FIG. 3, a superconductive ground plane 15 is illustrated. The substrate upon which the ground plane has been deposited has been omitted from the illustration for convenience. Those with ordinary skill in the art will understand that the diagrammatic representation of FIG. 3 illustrates the deposition, in overlying layers, of the various components which are referred to here.

Located above the superconducting ground plane 15 is a superconductive memory loop 16. The loop 16 contains one or more Josephson junctions which, for ease in illustration, have been omitted.

In the embodiment of the invention illustrated in FIG. 3, a resistive loop 17 is located between the ground plane 15 and the memory loop 16. As is well known to those of ordinary skill in the art the memory loop 16 and ground plane 15 are superconductive only in a predetermined range of operating temperatures. Since the resistive loop 17 is in the same environment as the other components it is formed of normal, that is non-superconductive, material. Also illustrated in the embodiment of FIG. 3 are insulating layers 18 one located between the superconductive ground plane 15 and the resistive loop 17, and another located between the resistive loop 17 and the memory loop 16.

The effect of the resistive loop 17 is illustrated in FIG. 2 by the circuit consisting of L′ and R′ which combination is inductively coupled to the memory cell. The inductance of the resistive loop 17 is a function of the geometry of the loop. The resistance R′ of the resistive loop 17 is a function, not only of the geometry of a loop but of the resistive material as well. In addition to the inductance and the resistance of the resistive loop 17, the coefficient of coupling between the resistive loop 17 and the memory loop 16, determines the effect of the resistive loop 17 in the memory loop 16. The coefficient of coupling is strictly a function of the geometry of the resistive loop 17 and memory loop 16. In particular, the area of the memory loop 16, the area of the resistive loop 17, and the distance between them are significant. It is generally preferable to have the resistive loop 17 lie in a plane which is different from the plane in which memory loop 16 lies but which is parallel therewith. By adjusting these factors the effect of the resistive loop 17 in the memory loop 16 can be selected. In one embodiment of this invention, the effect of the resistive loop in the memory loop is adjusted so that the total effective resistance in the memory loop is equal to the resistance necessary for critical damping.

Various other embodiments of the invention include placing memory loop 16 between the ground plane 15 and the resistive loop 17. Furthermore, the insulating layer 18 which lies between the memory loop 16 and the resistive loop 17 may be omitted. Furthermore, the resistive loop 17 can be so proportioned that the total effective resistance in the memory loop is less than the resistance necessary for critical damping. This results in a parallel R-L-C circuit which is over damped. That is, $R < \frac{1}{2}\sqrt{L/C}$.

In fabricating a superconductive memory loop employing the principles of the present invention one proceeds in the conventional manner to deposit a superconductive ground plane on a substrate. An insulating layer is then provided above the ground plane and, in one embodiment of this invention, a resistive loop of appropriate dimensions and material is then deposited upon the insulating layer. A further insulating layer may then be deposited above the resistive loop and finally, the memory loop is then deposited over the insulating layer. Fabricating a superconductive memory loop in accordance with the teachings of this invention can be accomplished using conventional fabricating techniques. Therefore, no further discussion of the manner in which the memory loop is fabricated is desirable.

The memory loop, in operation, is substantially identical to the operation of the memory loop disclosed in the aforementioned patent. That is, information is written into, and read out of the memory loop as described in said patent. The memory loop, however, fabricated with sub-mil technology, is properly damped for efficient and effective operation by reason of the resistive loop which is in flux-coupling relationship to the memory loop. As the current in the memory loop increases, a current is induced into the resistive loop. By reason of the latter current energy is dissipated in the resistive loop to effect the damping correction of the memory loop.

By reason of the foregoing construction, it should be apparent to those skilled in the art, that the present invention provides a superconductive memory loop employing Josephson junctions which can be critically or overdamped even though the memory cell components, excluding the resistive loop, would result in an underdamped cell. Furthermore, the present invention provides for a properly damped memory cell without requiring excessive substrate area taken up by an external resistor. To this end, it will be understood that there is little or no disadvantage to adding additional layer on a substrate. What is to be avoided is the occupation of excess substrate area. By reason of the available materials the prior art solution to adjusting the damping of a memory cell required an excessively long external resistor connected to the Josephson junction area. The foregoing disadvantages of the prior art have been overcome by locating a resistive loop inductively coupled to the memory loop, either below or above the memory loop.

What is claimed is:

1. A memory cell comprising a superconducting first loop with at least one Josephson device therein, said loop having an equivalent circuit comprising a parallel combination of a resistor $R_j$, a capacitor C and an inductance L, wherein $R_j > \frac{1}{2}\sqrt{L/C}$, and a second loop including resistive means, said second loop in flux-coupling relation to said first loop to provide an effective equivalent resistance in said first loop which is $\leq \frac{1}{2}\sqrt{L/C}$.

2. The apparatus of claim 1 in which said first and second loops are located in first and second spaced planes respectively.

3. The apparatus of claim 1 in which said second loop comprises non-superconductive material at said operating temperature.

4. The apparatus of claim 1 in which said second loop is located in a plane between the plane of said first loop and a ground plane.

5. The apparatus of claim 1 in which said first loop is located in a plane between the plane of said second loop and a ground plane.

6. The apparatus of claim 1 in which said first loop has at least one Josephson device therein.

7. The apparatus of claim 1 in which $R = \frac{1}{2}\sqrt{L/C}$ whereby said memory cell is critically damped.

8. The apparatus of claim 1 in whch $R < \frac{1}{2}\sqrt{L/C}$ whereby said memory cell is overdamped.

9. The apparatus of claim 1 in which said first loop occupies an area $A_1$ and said second loop occupies an area $A_2$, where $A_1 \neq A_2$.

10. The apparatus of claim 9 in which $A_1 > A_2$.

11. The apparatus of claim 9 in which said first loop lies in a first plane and said second loop lies in a second plane parallel to said first plane.

12. The apparatus of claim 1 which includes an insulating layer between said first loop and said second loop.

13. A memory cell which is properly damped for effective operation and which comprises a plurality of components deposited in separate layers overlying each other, said components including, a substrate, a superconducting ground plane deposited on said substrate, a loop of normal material, and a superconductive memory loop including at least one Josephson device therein.

14. The memory cell of claim 13 in which said loop of normal material is deposited above said ground plane and below said memory loop.

15. The memory cell of claim 13 in which said memory loop is deposited above said ground plane and below said loop of normal material.

16. The memory cell of claim 13 in which said loop of normal material is inductively coupled to said memory loop.

17. The memory cell of claim 13 which includes insulating means deposited above said ground plane and further insulating means deposited between said loop of normal material and said memory loop.

* * * * *